US006531841B1

(12) United States Patent
Elli et al.

(10) Patent No.: US 6,531,841 B1
(45) Date of Patent: Mar. 11, 2003

(54) ACTUATION AND CONTROL DEVICE FOR ELECTRIC SWITCHGEAR

(75) Inventors: Enrico Elli, Verano Brianza (IT); Costante Piazza, Lodi (IT); Fabio Montelaghi, Bergamo (IT)

(73) Assignee: ABB ADDA S.p.A., Lodi (IT)

( * ) Notice: Subject to any disclaimer, the term of this patent is extended or adjusted under 35 U.S.C. 154(b) by 0 days.

(21) Appl. No.: 09/700,752

(22) PCT Filed: May 14, 1999

(86) PCT No.: PCT/EP99/03372

§ 371 (c)(1),
(2), (4) Date: Nov. 20, 2000

(87) PCT Pub. No.: WO99/60591

PCT Pub. Date: Nov. 25, 1999

(30) Foreign Application Priority Data

May 19, 1998 (IT) ........................................ MI98A1102

(51) Int. Cl.[7] ............................ G05B 5/00; G05D 3/00; H02H 7/08; H02P 1/04; H02P 3/00

(52) U.S. Cl. ....................................... 318/466; 318/265

(58) Field of Search ................................ 318/261, 266, 318/257, 267, 288, 290

(56) References Cited

U.S. PATENT DOCUMENTS

| | | | | |
|---|---|---|---|---|
| 2,891,122 A | | 6/1959 | Froland | |
| 3,654,535 A | * | 4/1972 | Hendry et al. | |
| 3,742,246 A | | 6/1973 | Nitta et al. | |
| 4,910,443 A | * | 3/1990 | Zylstra et al. | |
| 4,912,380 A | * | 3/1990 | Zylstra et al. | |
| 5,519,295 A | * | 5/1996 | Jatnieks | |
| 6,252,365 B1 | * | 6/2001 | Morris et al. | |

FOREIGN PATENT DOCUMENTS

| | | |
|---|---|---|
| DE | 1 665 545 | 2/1971 |
| DE | 2 063 475 | 6/1972 |
| DE | 0 185 238 | 6/1986 |
| WO | WO 90/08423 | 7/1990 |

* cited by examiner

*Primary Examiner*—Jeffrey Donels
(74) *Attorney, Agent, or Firm*—Oblon, Spivak, McClelland, Maier & Neustadt, P.C.

(57) ABSTRACT

A control and actuation device for opening and/or closing an electric switching device having at least one fixed contact and at least one movable contact, which includes an actuating device operatively connected to the movable contact and which supplies energy to perform opening/closure. The actuating device includes a motor with position control, which is operatively connected to the movable contact, and a power and control electronic unit which, following a tripping command, sends to the motor electrical signals for driving the motor so that the movable contact achieves a predefined rule of motion.

10 Claims, 14 Drawing Sheets

CLOSED OPEN

ACTUATION AND CONTROL DEVICE FOR ELECTRIC SWITCHGEAR

BACKGROUND OF THE INVENTION

Field of the Invention

The present invention relates to an actuation and control device for opening/closing electric switching means, for example circuit breakers, reclosers, disconnectors and the like particularly for high- and medium-voltage transmission and/or distribution grids. The device according to the present invention is particularly adapted for use in high-voltage circuit breakers and is now described with reference to this application without limiting in any way its scope of application.

An example of a single pole operated circuit breaker provided with a conventional actuation device is shown schematically in FIG. 1. A first post-shaped supporting isolator 2 is arranged on a supporting frame 1; a second isolator 3 is arranged on the upper end of said first isolator, and an interruption chamber, with interruption mechanisms constituted by fixed contacts and movable contacts, is provided inside said second isolator. Closure and opening are performed by respectively engaging and disengaging the fixed contacts with respect to the movable contacts. The movable contacts are operatively connected to an actuation rod, which runs inside the isolator 1 from the movable contacts to the base of the post. The rod is actuated by means of kinematic systems located in a housing 4 at the base of the post and operatively connected to an actuating device 5. Actuating devices of high-voltage switches are currently of the mechanical or hydraulic type. The mechanical actuation device is generally provided with two springs, namely a closing spring and an opening spring a stroke-limiting shock absorber, a reloading motor for the closing spring, and a mechanism for the following operations: converting the motion produced by the springs into a translatory motion of the movable contact; reloading the opening spring: making the opening operation independent of the closing operation.

A schematic example of a device of this kind is shown in FIG. 2 in which the following elements can be recognized: an opening spring 10 an opening device 11 actuated by an electromagnet an eccentric element with a lever 12, a closing device 13 actuated by an electromagnet a main shaft 14, an arm 15 which is rigidly coupled to the shaft 14, a closing spring 16, a shock absorber 17, a drum 18 and a gearmotor 19. There are many configurations which are alternative to the one illustrated here but in general the mechanical actuating devices of the prior art have a very large number of components which require long and complicated preliminary settings.

Although achieving the task for which they are meant, said devices have many disadvantages in addition to the already mentioned mechanical complexity. The movement of the movable contact is in fact determined exclusively by the elastic characteristic of the opening and closing springs; the rule of motion of the movable contact cannot be changed by the user but is set during design. Actuating devices of the hydraulic type, in which the movement of the movable contact is ensured by adapted hydraulic actuators can partially obviate these drawbacks but have disadvantages linked to the presence of fluids particularly owing to their temperature-sensitivity.

The absence of control over the rule of motion of the actuator also requires the presence of dampers or shockabsorbers to dissipate the residual kinetic energy at the end of the actuating operation and to avoid uncontrolled impacts against the pole. Furthermore, precision in the positioning of the movable contact is limited by a mechanism which is inherently inaccurate owing to the presence of the springs.

Owing to the large number of components the devices of the prior art require maintenance in order to maintain their nominal behavior and thus ensure repeatability of the actuation by compensating for variations due to system wear and aging. Actuation repeatability in any case has inherent limits.

SUMMARY OF THE INVENTION

Another problem is due to response times, i.e., to the elapsed time between the actuating command and the beginning of the movement of the movable contact which is currently on the order of a few milliseconds.

Another disadvantage is due to the high noise level of conventional devices which can require the use of acoustic insulation systems on the casing of the switchgear in order to limit its environmental impact.

Moreover, the energy that must be supplied is higher than the energy strictly required to move the movable contact, since it is necessary to also move the various mechanical elements of the switchgear.

The aim of the present invention is to provide an actuating and control device for electric switching means particularly of the high- and medium-voltage type such as for example circuit breakers disconnectors, reclosers and the like which allows to move the movable contact of said electric switching means according to a predefined rule of motion.

Within the scope of this aim, an object of the present invention is to provide a control and actuation device for electric switching means which has reduced mechanical complexity.

Another object of the present invention is to provide a control and actuation device for electric switchgear which allows to predefine the positioning precision of the movable contact both during opening and closing operation.

Another object of the present invention is to provide a control and actuation device for electric switching means which ensures repeatability of the maneuver optionally compensating for variations due to aging and wear.

Another object of the present invention is to provide a control and actuation device for electric switching means which has reduced response times.

Another object of the present invention is to provide a control and actuation device for electric switching means which is highly reliable, relatively easy to manufacture and at competitive costs.

This aim these objects and others which will become apparent hereinafter are achieved by a control and actuation device for opening and/or closing electric switching means such as circuit breakers, disconnectors reclosers and the like having at least one fixed contact and at least one movable contact said device comprising actuating means operatively connected to the movable contact, said actuating means supplying the energy to perform opening/closing operation. The device according to the invention is characterized in that said actuating means comprise a position control motor which is operatively connected to the movable contact and a power and control electronic unit which drives said motor so that the movable contact achieves a defined rule of motion.

Control of the rule of motion of the movable contact allows to ensure accuracy and repeatability of the switching action. The actuating device is also considerably simplified with respect to switchgear of the prior art since it allows to eliminate the opening, and closing springs the motor for reloading the closing spring and all the mechanism that allow to perform the switching cycles: accordingly the size of the actuating ,device is also reduced.

Further characteristics and advantages will become apparent from the description of some preferred but not exclusive embodiments of a control and actuating device for opening, and/or closing electric switching means illustrated only by way of non-limitative example in the accompanying drawings wherein.

Figure 1:
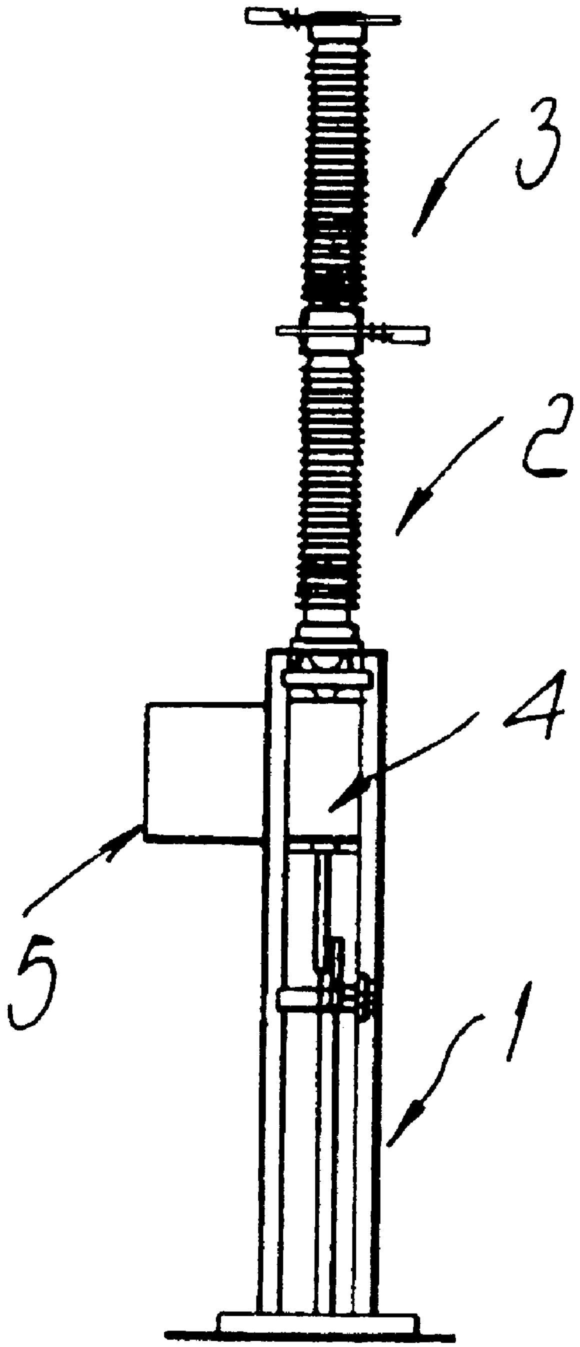
FIG. 1 is a schematic view of a pole of a single pole operated circuit breaker provided with a conventional actuation device.
Figure 2:
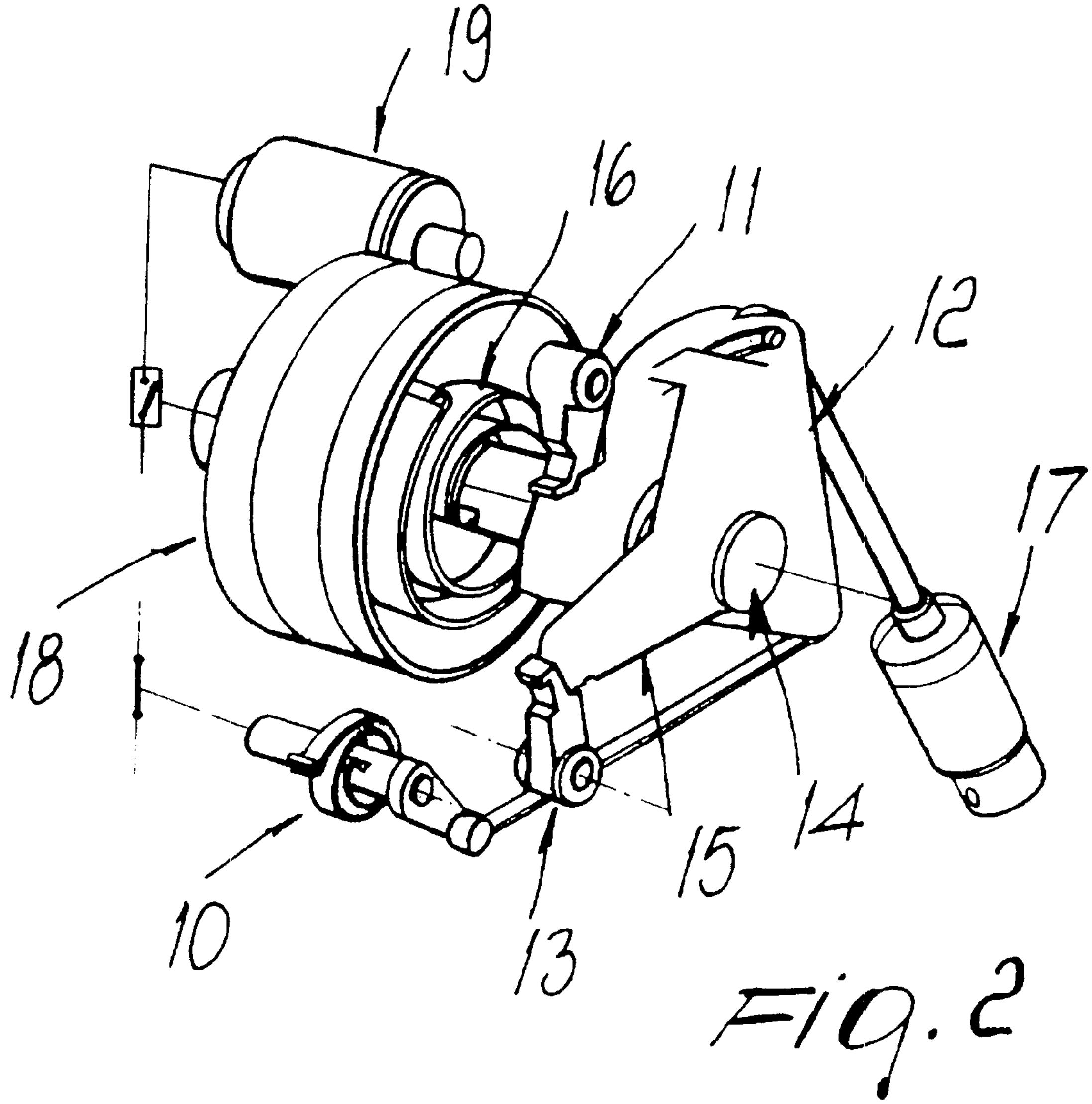
FIG. 2 is a schematic view of an example of a conventional mechanical actuation device.
Figure 3:
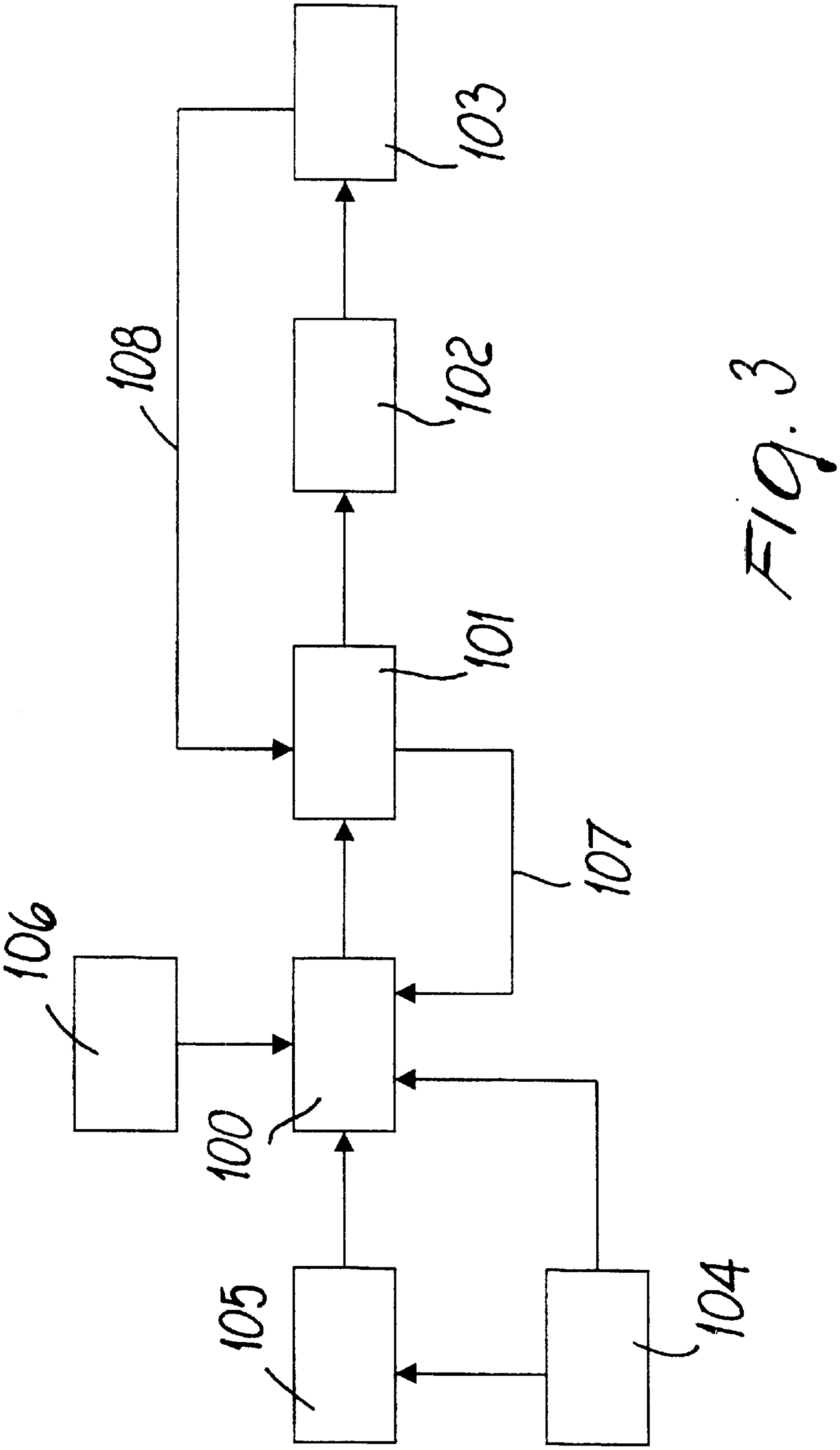
FIG. 3 is a block diagram of a device according to the invention.

With reference to FIG. 3 the control and actuating device according to the invention comprises a control and power supply unit 100 which following a tripping command 106 (arriving for example from an operator or from a protection system) drives the position control motor 101. The motor 101 is operatively connected to the movable contact 103 of the electric switching means of a suitable kinematic linking 102. The motor 101 is driven by the unit 100 so that the movable contact 103 achieves a predetermined rule of motion.

Position control is generally performed by means of a position sensor located on the motor 101 which sends to the control unit 100 information 107 related to the movement of said motor. Position control can also be performed by a position sensor for the movable contact 103 which sends to the control unit 100 information 108 related to the actual position of the movable contact. Said position sensor can simply be a limit switch which reports to the control unit 100 that the required switching action has been completed.

The control and power supply unit 100 can be powered directly by the electric grid 104. However, the device preferably has an auxiliary energy-accumulation power supply system 105. Preferably said system, constituted for example by a battery of capacitors must be able to store and deliver at least the energy required for a quick opening/closing/opening (OCO) switching cycle.

By means of the control and power supply unit 100 it is possible to program the rule of motion of the movable contact in a simple and flexible manner as a function both of the command and of the type of fault possibly detected. It is also possible to predefine the positioning precision of the movable contact, both during opening and during closing, thereby reducing the risks of damage currently deriving from over-stroke problems. Position control performed on the motor and/or on the movable contact allows to brake the movable contact at the end of the switching action thus eliminating the need to use a shock absorber.

Preferably the position control motor is constituted by a rotary servomotor with a position sensor. In this case the connection between the motor and the movable contact occurs by means of a kinematic linking which is capable of converting the rotary motion of the driving shaft into a substantially linear motion of the movable contact. The use of a servomotor allows high power levels to be available with very short delivery times. For an equal power it is furthermore possible to act with two independent control parameters (torque and/or speed), allowing greater flexibility during design.

Figure 5:
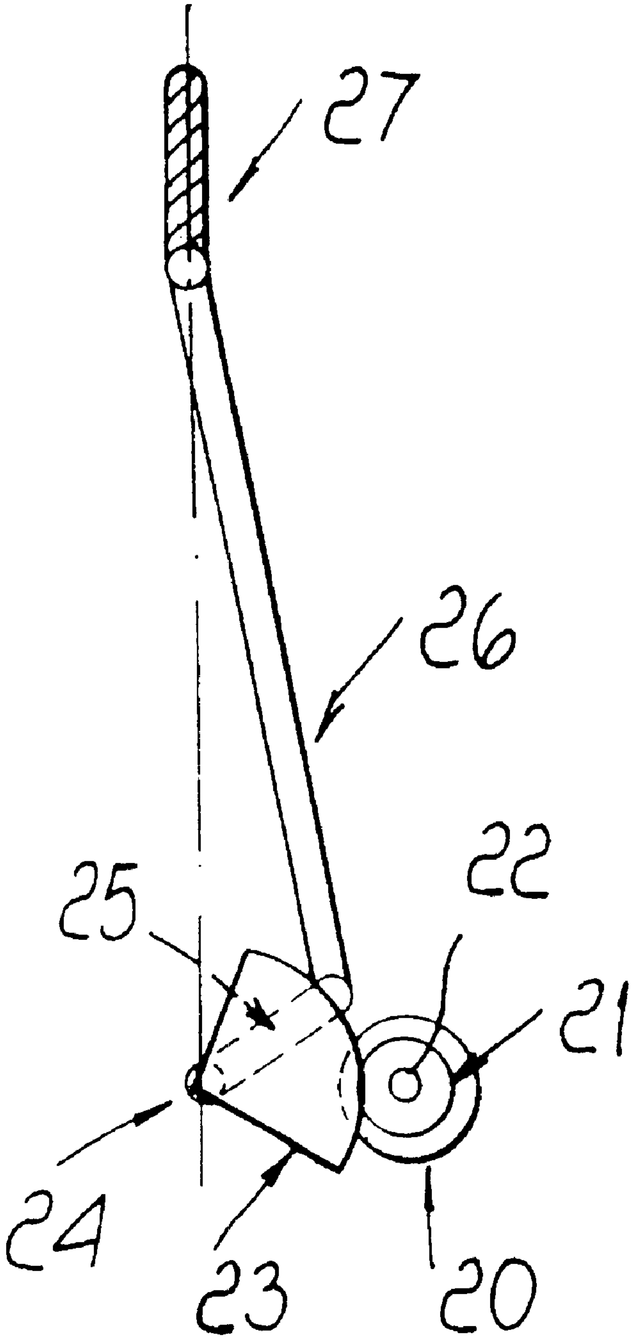
FIG. 5 is a view of a possible embodiment of the kinematic linking in a device according to the invention.
Figure 6:
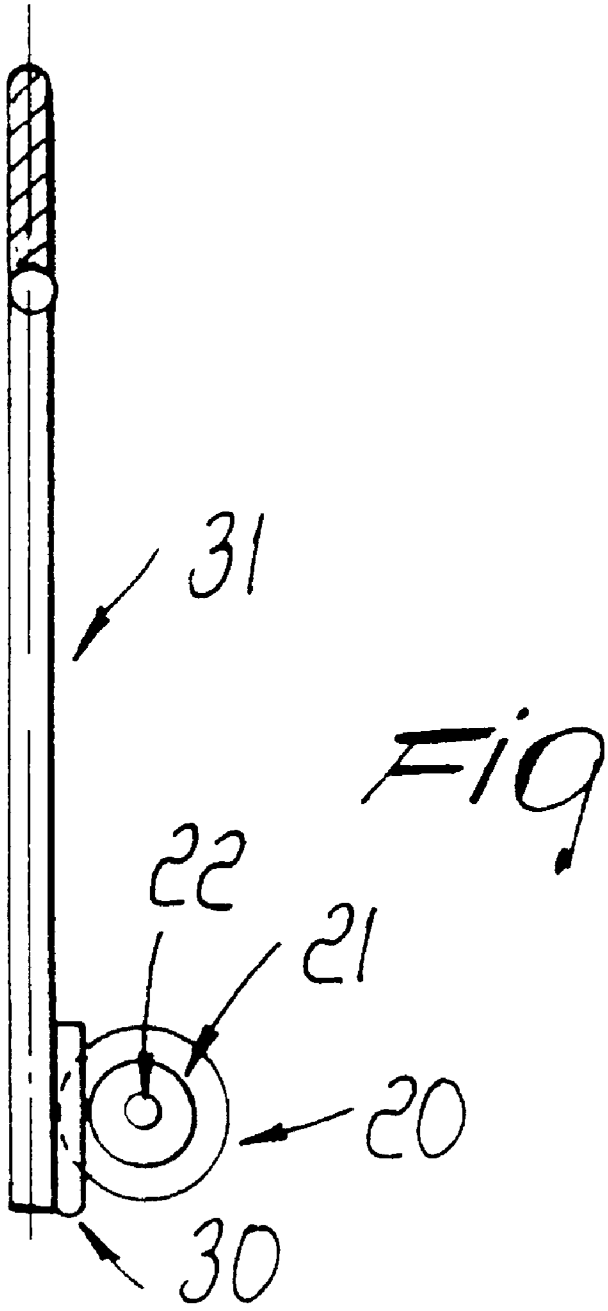
FIG. 6 is a view of another embodiment of the kinematic linking in a device according to the invention.
Figure 9:
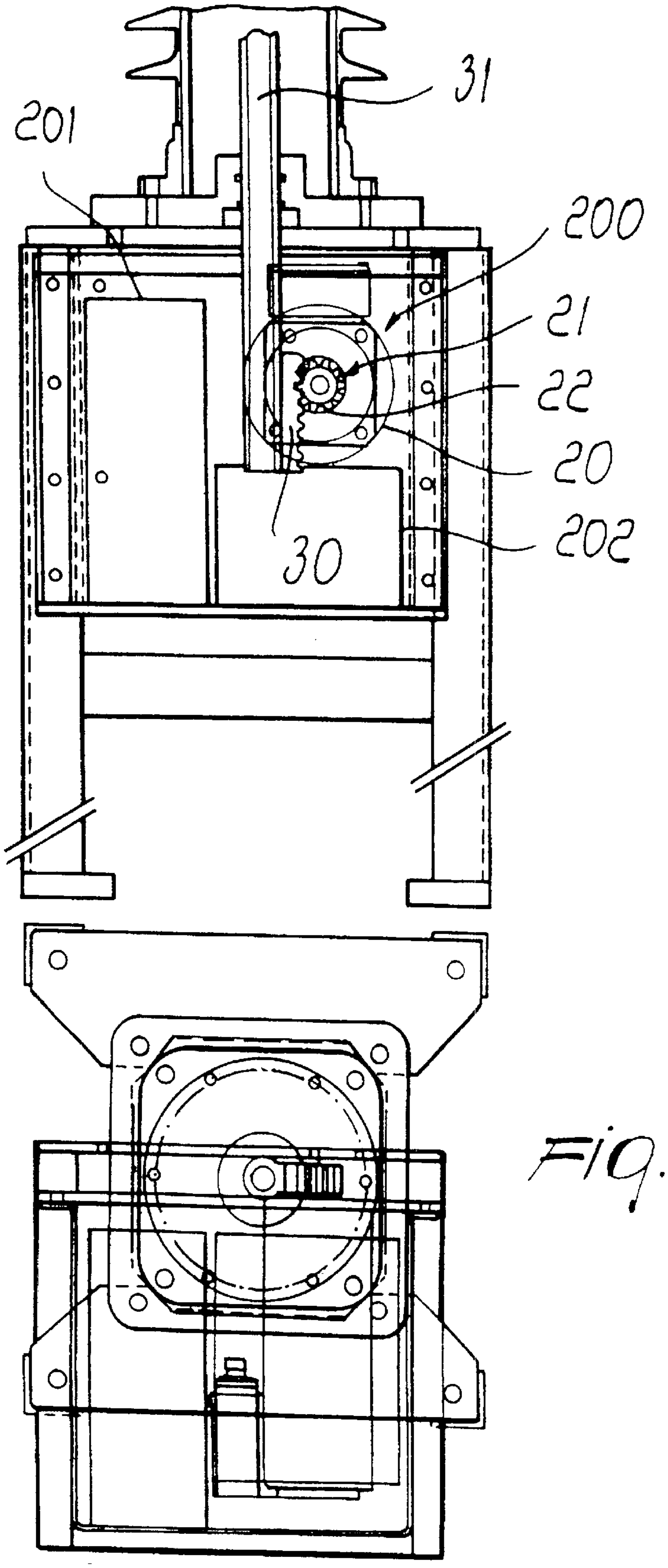
FIG. 9 is a view of a practical implementation of the device of FIG. 6.

Some non-limitative examples of possible embodiments of the kinematic linking in a device according to the invention are shown schematically in FIGS. 5 and 6. With reference to FIG. 5 the motor 20 is operatively coupled to the movable contact 27 by means of a kinematic linking which comprises a pinion 21 mounted on the output of the driving shaft. The pinion 21 is coupled to a gear or, more simply as shown in FIG. 5 with a gear sector 23. The sector 23 is rigidly coupled to a shaft 24 which is in turn rigidly coupled to a crank 25. The crank 25 is connected to a movable contact actuating rod 26 which transmits the motion to said movable contact 27. In the embodiment of FIG. 6 the motor 20 is operatively coupled to the movable contact 27 by means of a kinematic linking which includes a pinion 21 mounted on the output of the driving shaft 22. The pinion 21 is coupled to a rack 30 which is rigidly coupled to an actuation rod 31 for the movable contact 27, thus converting the rotary motion into a translatory motion of the movable contact. FIG. 9 illustrates the practical implementation of the mechanism of FIG. 6; in particular it shows at the base of one pole, the kinematic systems described in FIG. 6 and generally designated by the reference numeral 200 the electronic system 201 and the energy storage system 202.

Figure 4:
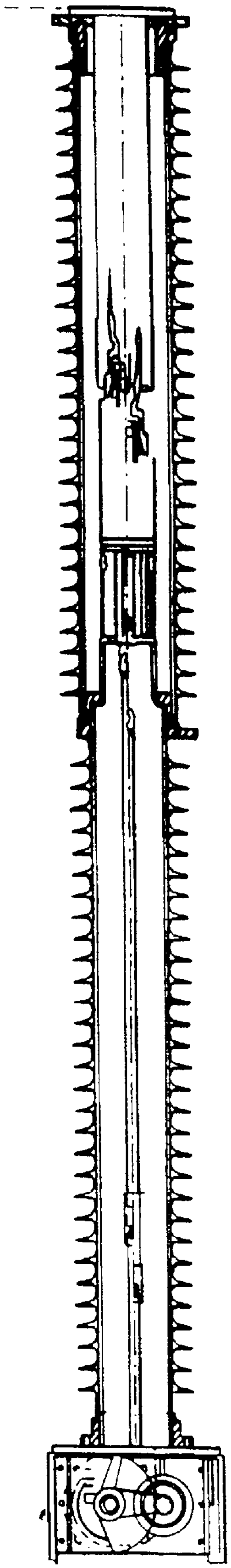
FIG. 4 is a view of a single pole operated high-voltage circuit breaker provided with a device according to the invention.

The device according, to the invention is conveniently applied in various kinds of electric switching means, such as circuit breakers, disconnectors reclosers and the like and is particularly adapted for high-voltage circuit breakers. FIG. 4 illustrates an example of a single pole operated high-voltage circuit breaker which comprises a control and actuating device according to the invention in the left part of the figure the circuit breaker is shown in the closed position, while in the right part it is shown in the open position. In the case of the circuit breaker shown in FIG. 4 the position control motor is a rotary servomotor and connection between the motor and the movable contact occurs by means of a mechanism of the type shown in FIG. 5.

Figure 7:
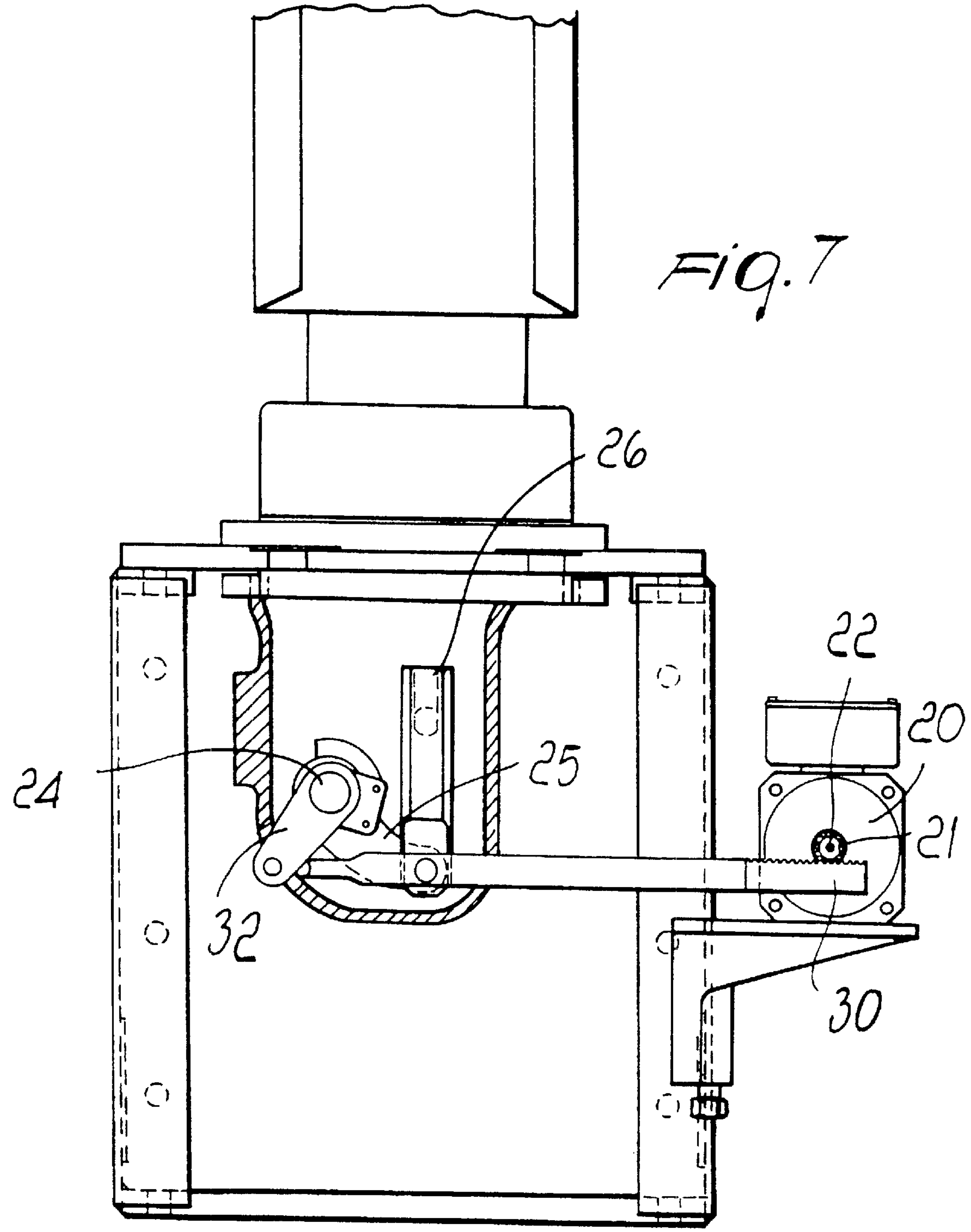
FIG. 7 is a view of a particular embodiment of the device according to the invention which can be applied to a single pole of a high-voltage circuit breaker.

Another example of possible application to a pole of a high-voltage circuit breaker is shown in FIG. 7 in which the motor 20 is operatively coupled to the movable contact not shown in figure by means of a kinematic linking which comprises a pinion 21 which is mounted on the output of the driving shaft 2B. In particular the pinion 21 is coupled to a rack 30 in a manner similar to the one described in figure in this case according to a possible embodiment the rack 30 is in turn connected to the actuating rod 26 of the movable contact by means of a system constituted by a crank 215 and a lever 32. Both the crank 25 and the lever 32 by virtue of the rotation of the motor and of the translatory motion of the rack rotate rigidly with the shaft 24 and allow to convert the rotary motion of the driving shaft into the translatory motion of the movable contact.

Figure 11:
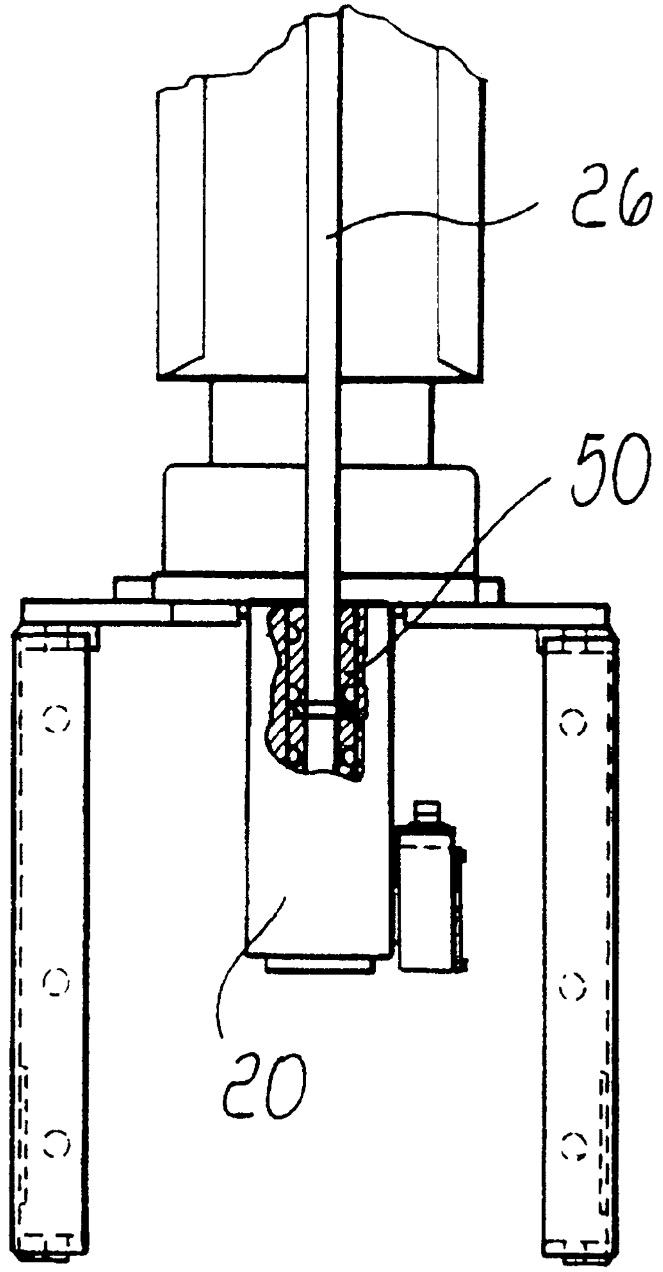
FIG. 11 is a view of a single pole of a high-voltage circuit breaker provided with a device according to another embodiment of the invention.

Another form of application to a single pole of a circuit breaker is shown schematically in FIG. 11 in which conversion of the motion from rotary to translatory is achieved, according to another embodiment of the kinematic linking by using a worm screw which is integrated in the motor 20 and directly coupled to the actuating rod 26 in this case, the rotation of the motor causes the consequent movement of the worm screw which in turn entails the consequent translatory motion of the rod 26.

Figure 8:
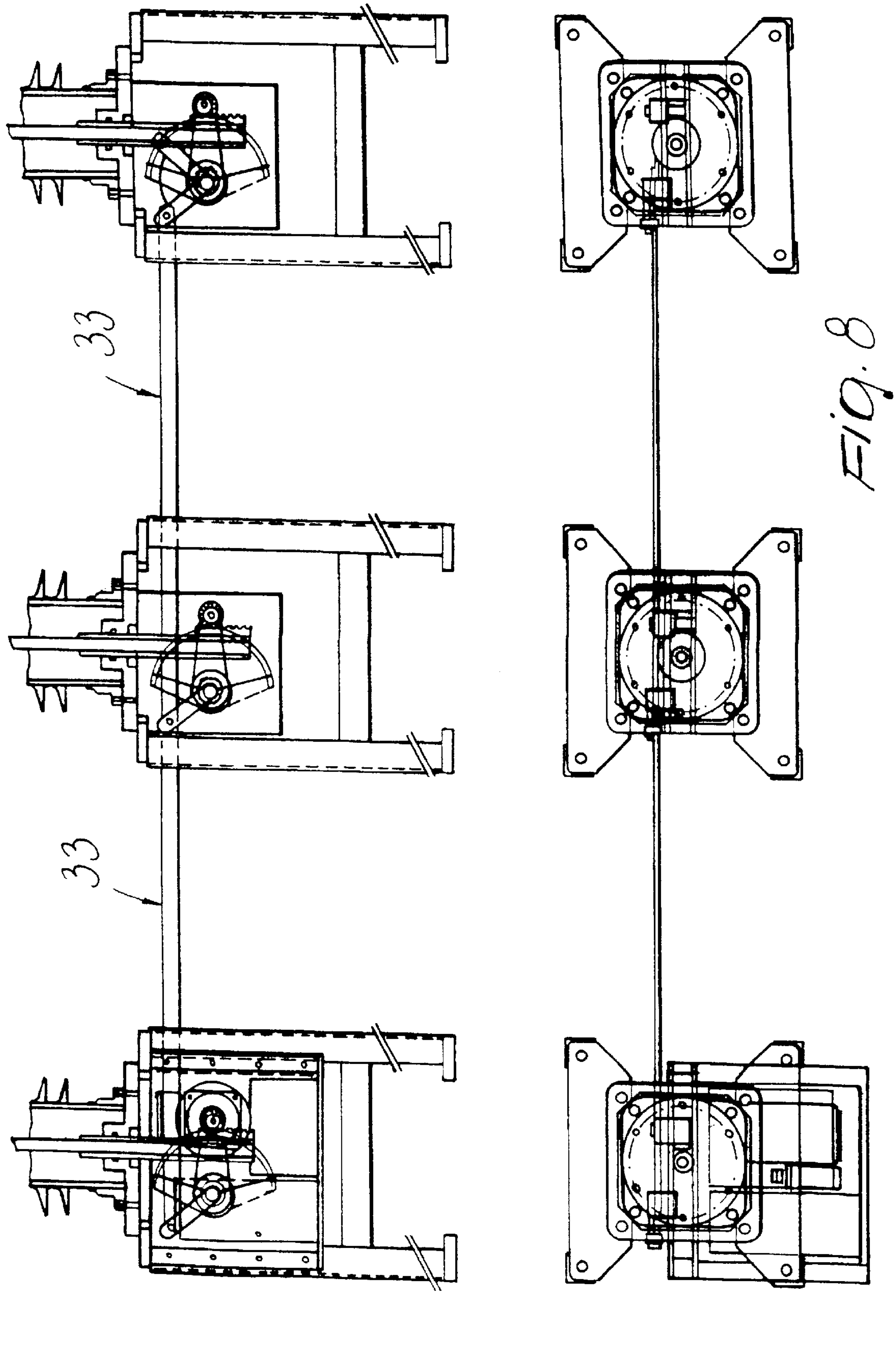
FIG. 8 is a view of a three-pole operated circuit breaker provided with a single actuating and control device according to the embodiment of FIG. 5.
Figure 10:
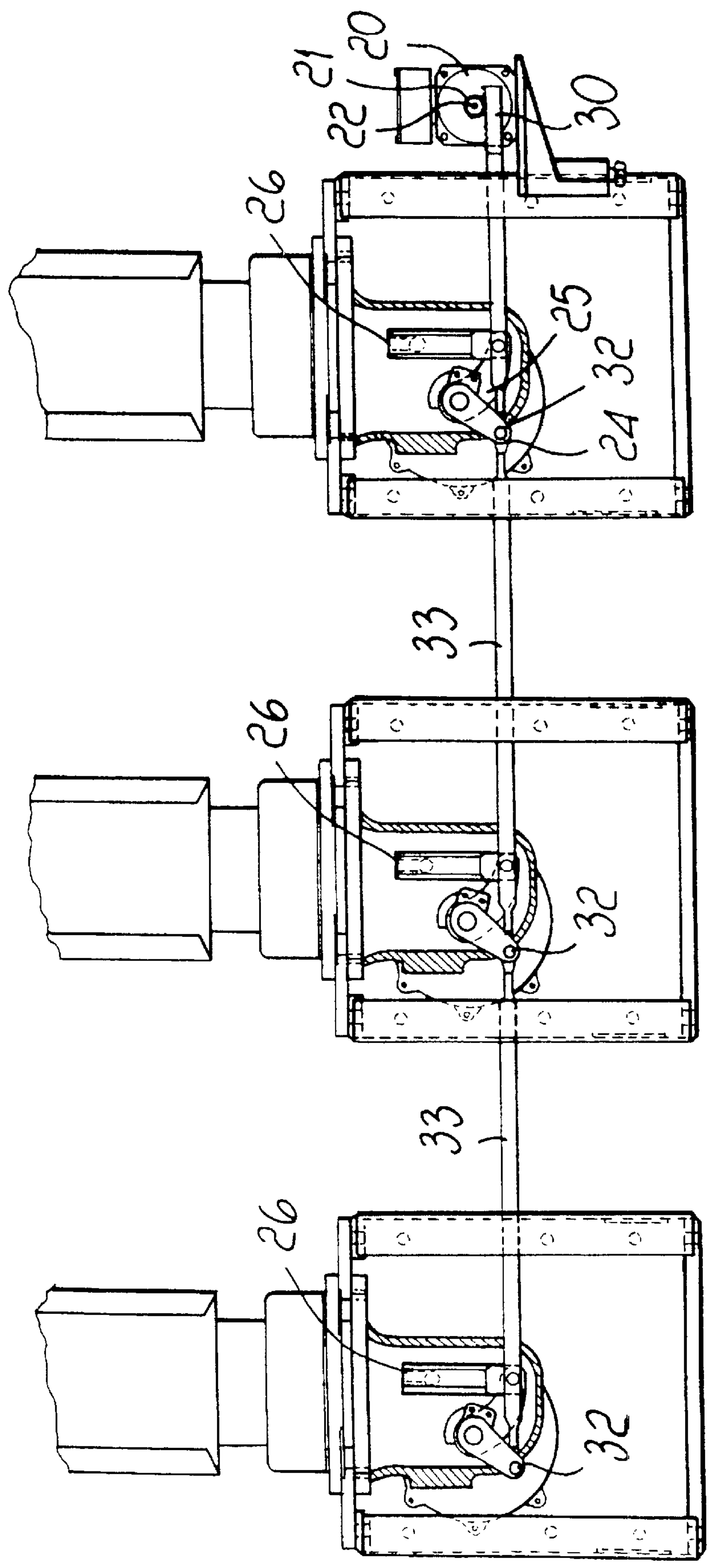
FIG. 10 is a view of a three-pole operated circuit breaker provided with a single control and actuating device according to the embodiment of FIG. 7.

If the electrical switching means is constituted by a three-pole high-voltage circuit breaker for opening and closing a circuit connected thereto, each individual pole can comprise an actuating and control mechanism according to the invention. In this manner by appropriately programming the electronic control and power supply unit, it is possible to provide a synchronous opening or closing action i.e. during a selected time-window in relation to the waveform of the electrical parameters. As an alternative as shown in FIGS. 8 10 and 12 the three-pole circuit breaker can have a single actuating and control device according to the invention in one of the corresponding embodiments shown in FIG. 5 7 and 11 in such situations, the device is mechanically coupled to each individual pole of the switch by adopting suitable rods 33.

Figure 12:
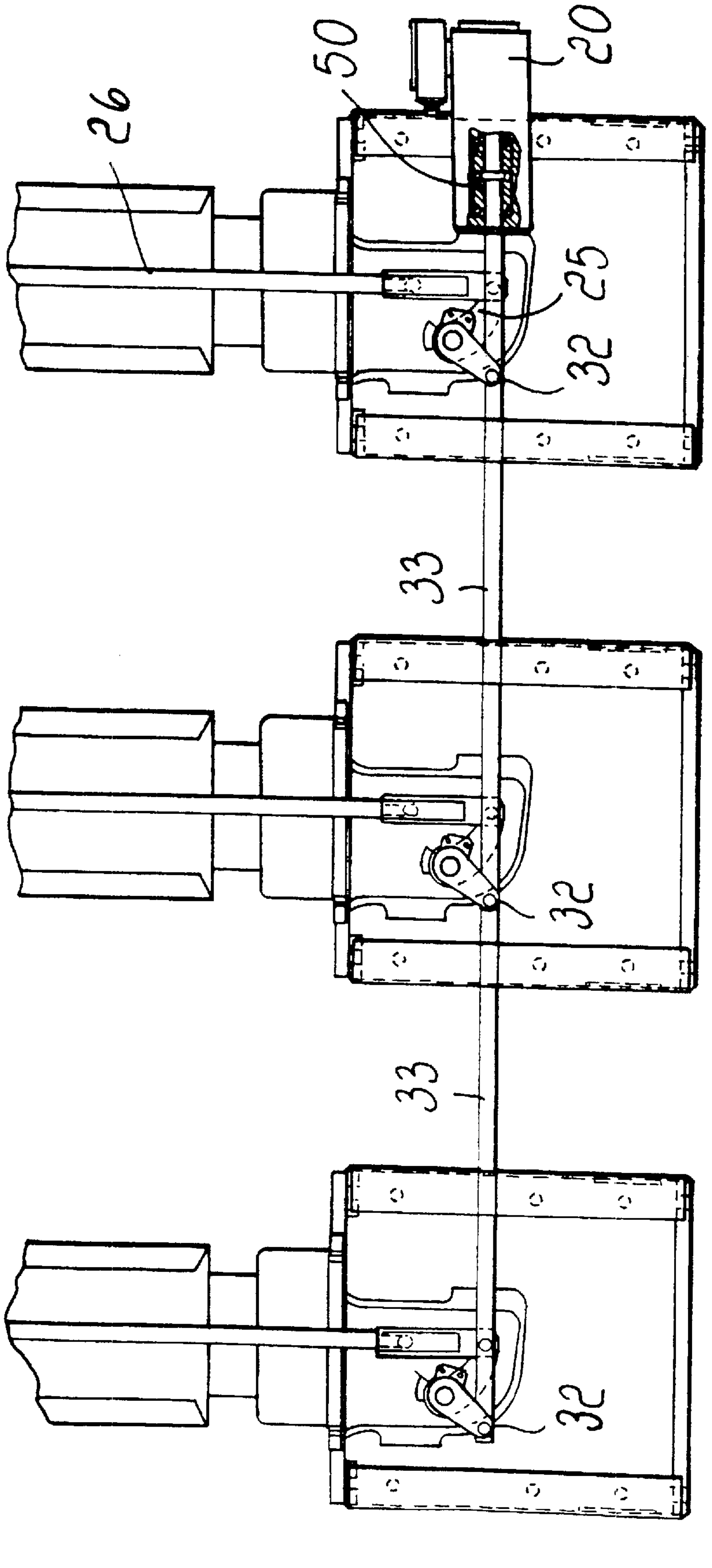
FIG. 12 is a view of a three-pole operated circuit breaker provided with a single control and actuating device according to the embodiment of FIG. 11.

In particular. as shown in FIG. 12, if the kinematic linking entails the use of a worm screw the worm screw 50 is integrated in the motor and as a consequence of the rotation of said motor forces the rod 33 to perform a translatory motion the presence for each pole of a linking system constituted by a lever 25 and a crank 32 similar to what has already been described allows to obtain a corresponding translatory motion for each one of the rods 26.

Figure 13:
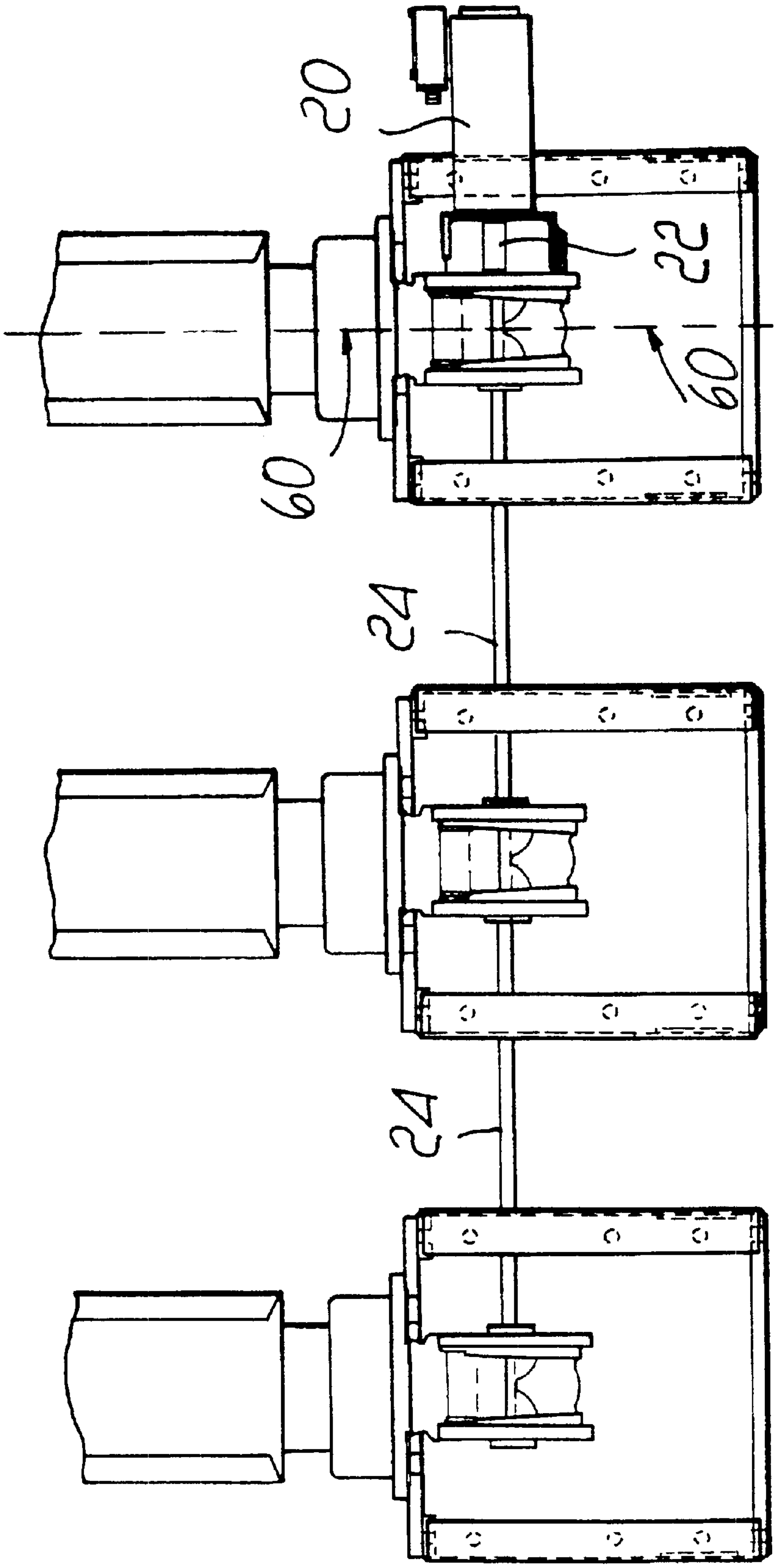
FIG. 13 is a view of an application of a particular embodiment of the device according to the invention to a three-pole operated circuit breaker.
Figure 14:
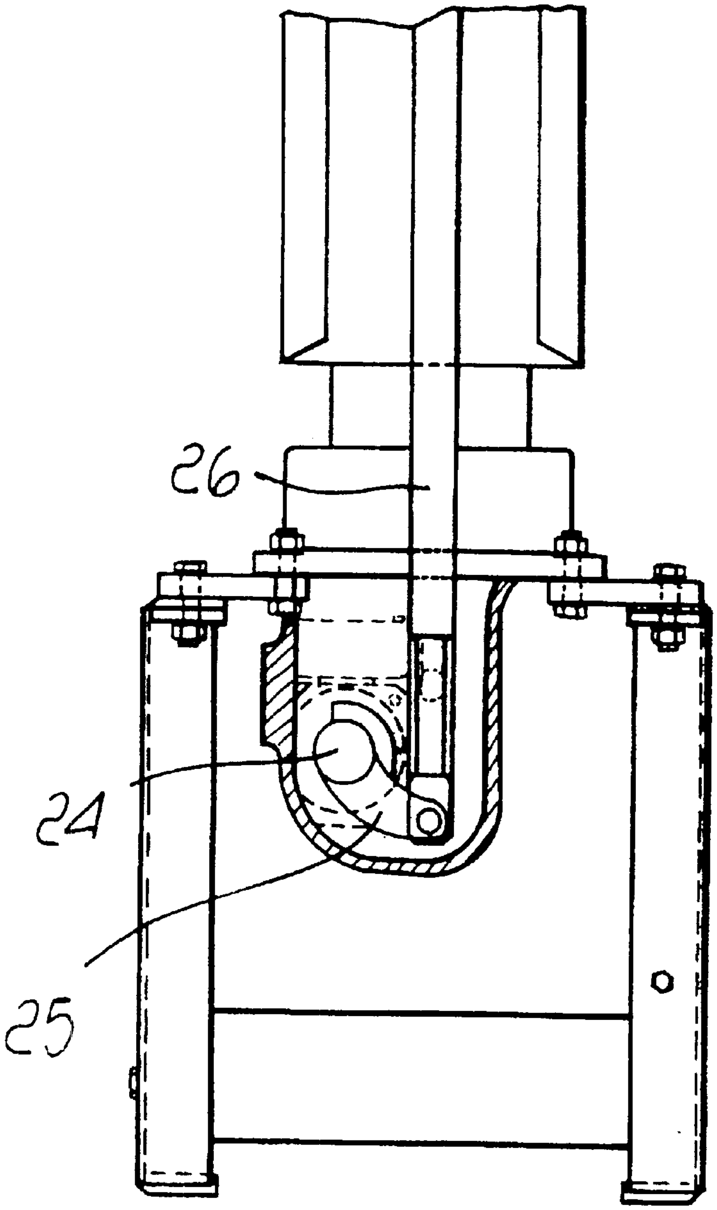
FIG. 14 is a sectional view taken along the plane 60—60 of FIG. 13.

A further embodiment in the case of a three-pole operated circuit breaker is shown in figures 13 and 14 in which the driving shaft 22 is directly connected to the rotation shaft 24 rigidly coupled to the crank 25. In this manners the rotation of the shaft 22 entails the rotation of the shaft 24 and of the crank 25. Accordingly, this allows to have direct actuation of the movable contact, (not shown in the figure), which is connected to the rod 26 and performs a translatory motion by virtue of the rotation of the motor.

The actuating and control device according to the invention can be furthermore characterized by very short response times which are much shorter than those of devices of the prior art which are on the order of a few milliseconds. It has in fact been found that in the case of high-voltage switches the response time can be less than 1 millisecond generally on the order of tens of microseconds. Response time is defined as the time elapsing between tripping command and beginning of the movement of the movable contact. High-voltage circuit breakers characterized by such short response times are not known in the state of the art. Accordingly, the present invention also relates to a high-voltage circuit breaker which is characterized in that the response time, defined as the elapsed time between tripping command and the beginning of the movement of the movable contact is less than 1 millisecond.

In practice it has been found that the actuating and control device according to the invention fully achieves the intended aim since it allows to improve the characteristics of electric switching means by controlling the rule of motion of the movable contact.

In addition to the above advantages, the actuating and control device allows to reduce costs by reducing the parts reducing the calibration operations and eliminating movements and stresses that can give rise to impact damage. Accordingly maintenance costs are also reduced.

The device thus conceived is susceptible of modifications and variations, all of which are within the scope of the inventive concept all the details may furthermore be replaced with technically equivalent elements. In practice the materials used so long as they are compatible with the specific use as well as the dimensions may be any according to the requirements and the state of the art.

What is claimed is:

1. An actuation and control device for at least one of opening and closing electric switching means having at least one fixed contact and at least one movable contact, comprising actuating means which are operatively connected to the movable contact and supply the energy to perform at least one of opening and closing, wherein, said actuating means comprise a position control motor which is operatively connected to the movable contact, and a power and control electronic unit which drives said position control motor so that the movable contact achieves a defined rule of motion, said position control motor is a rotary servomotor, and the connection between said position control motor and the movable contact is provided by means of a kinematic pair which is capable of converting a rotary motion of a driving shaft into a translatory motion of the movable contact.

2. An actuation and control device according to claim 1, comprising an auxiliary energy-accumulation system for supplying power to the electronic control and power supply unit.

3. An actuation and control device according to claim 2, wherein said auxiliary system is constituted by a battery of capacitors.

4. An actuation and control device according to claim 1, wherein position control is performed by a position sensor on the motor.

5. An actuation and control device according to claim 1, comprising a movable contact position sensor.

6. A pole of a high-voltage circuit breaker, comprising an actuation and control device for at least one of opening and closing electric switching means having at least one fixed contact and at least one movable contact, comprising actuating means which are operatively connected to the movable contact and supply the energy to perform at least one of opening and closing, wherein, said actuating means comprise a position control motor which is operatively connected to the movable contact, and a power and control electronic unit which drives said motor so that the movable contact achieves a defined rule of motion, said position control motor is a rotary servomotor, and the connection between said position control motor and the movable contact is provided by means of a kinematic pair which is capable of converting a rotary motion of a driving shaft into a translatory motion of the movable contact.

7. A three-pole high-voltage circuit breaker for opening and closing a circuit connected thereto, wherein each individual pole comprises an actuation and control device for at least one of opening and closing electric switching means having at least one fixed contact and at least one movable contact, comprising actuating means which are operatively connected to the movable contact and supply the energy to perform at least one of opening and closing, wherein, said actuating means comprise a position control motor which is operatively connected to the movable contact, and a power and control electronic unit which drives said motor so that the movable contact achieves a defined rule of motion, said position control motor is a rotary servomotor, and the connection between said position control motor and the movable contact is provided by means of a kinematic pair which is capable of converting a rotary motion of a driving shaft into a translatory motion of the movable contact.

8. A three-pole circuit breaker according to claim 7, wherein the three-pole circuit breaker operates by synchronous opening or closing action.

9. A three-pole high-voltage circuit breaker for opening and closing a circuit connected thereto, comprising:

an actuation and control device for at least one of opening and closing electric switching means having at least one fixed contact and at least one movable contact, comprising actuating means which are operatively connected to the movable contact and supply the energy to perform at least one of opening and closing, wherein, said actuating means comprise a position control motor which is operatively connected to the movable contact, and a power and control electronic unit which drives said motor so that the movable contact achieves a defined rule of motion, and said position control motor is a rotary servomotor; and a mechanism for coupling said actuation and control device to each individual pole of the switch, wherein the connection between said position control motor and the movable contact is provided by means of a kinematic pair connected to the mechanism which is capable of converting a rotary motion of a driving shaft into a translatory motion of the movable contact.

10. A high-voltage circuit breaker, comprising:

at least one fixed contact and at least one movable contact; and actuation means for separating the movable contact from the fixed contact upon a tripping command, wherein, said actuation means includes a rotary servomotor, and a connection between the rotary servomotor and the movable contact is provided by means of a kinematic pair which is capable of converting a rotary motion of a driving shaft into a translatory motion of the movable contact, and the response time, defined as the time elapsing between when the tripping command is sent and when the movable contact begins to move, is less than 1 ms.

* * * * *

UNITED STATES PATENT AND TRADEMARK OFFICE

CERTIFICATE OF CORRECTION

PATENT NO. : 6,531,841 B1 
DATED : March 11, 2003
INVENTOR(S) : Elli et al.

It is certified that error appears in the above-identified patent and that said Letters Patent is hereby corrected as shown below:

Title page,
Item [30], Foreign Application Priority Data, should read:

-- [30] Foreign Application Priority Data
May 19, 1998 (IT) .......................... MI98A001102 --

Signed and Sealed this

Twenty-second Day of July, 2003

JAMES E. ROGAN
*Director of the United States Patent and Trademark Office*